(12) United States Patent
Marchisio et al.

(10) Patent No.: US 12,460,724 B2
(45) Date of Patent: Nov. 4, 2025

(54) PROTECTION DEVICE FOR A SEALING RING, IN PARTICULAR AN OIL SEALING RING FOR VEHICLE TRANSMISSION COMPONENTS AND ASSOCIATED SEALING SYSTEM

(71) Applicant: AKTIEBOLAGET SKF, Gothenburg (SE)

(72) Inventors: Fabio Marchisio, Castelnuovo don Bosco (IT); Marco Bresso, Turin (IT); Gianluca Arobbio, Asti (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/417,000

(22) Filed: Jan. 19, 2024

(65) Prior Publication Data
US 2024/0255058 A1 Aug. 1, 2024

(30) Foreign Application Priority Data
Jan. 27, 2023 (IT) .......................... 102023000001245

(51) Int. Cl.
*F16J 15/3252* (2016.01)
*F16J 15/3204* (2016.01)

(52) U.S. Cl.
CPC ....... *F16J 15/3252* (2013.01); *F16J 15/3204* (2013.01)

(58) Field of Classification Search
CPC ...... F16J 15/32; F16J 15/3204; F16J 15/3248; F16J 15/3252; F16J 15/3256
(Continued)

(56) References Cited

U.S. PATENT DOCUMENTS

| | | | |
|---|---|---|---|
| 4,218,813 A * | 8/1980 | Cather, Jr. | .......... B25B 27/0028 29/464 |
| 4,815,884 A * | 3/1989 | Halliday, Jr. | ....... B25B 27/0028 403/17 |

(Continued)

FOREIGN PATENT DOCUMENTS

| | | |
|---|---|---|
| CN | 101457840 A | 6/2009 |
| CN | 102139785 A | 8/2011 |

(Continued)

OTHER PUBLICATIONS

Written Opinion and Search Report from the Italian Patent Office mailed Aug. 3, 2023 in related application No. IT 102023000012454, and partial translation thereof.

(Continued)

*Primary Examiner* — Nathan Cumar
(74) *Attorney, Agent, or Firm* — J-TEK LAW PLLC; Scott T. Wakeman; Mark A. Ussai (57) ABSTRACT

A protection device for a sealing ring and associated sealing system for a vehicle transmission component includes a plug which can be joined by means of a bayonet coupling together with an annular element configured to fit coaxially within the sealing ring in order to protect it during the insertion of a rotating shaft inside the sealing ring. The plug is provided with a cup portion which can be coupled in a fluid-tight manner inside a sleeve portion of the annular element by end sections of the sleeve and cup portions, the end sections being delimited by facing conical surfaces having different angles and are coupled together by an interference fit.

11 Claims, 5 Drawing Sheets

(58) Field of Classification Search
USPC .......................................................... 277/500
See application file for complete search history.

(56) References Cited

U.S. PATENT DOCUMENTS

| | | | | |
|---|---|---|---|---|
| 7,059,608 | B2* | 6/2006 | Ramsay | F16J 15/008 277/572 |
| 7,178,425 | B2* | 2/2007 | Marich | F16H 57/031 74/607 |
| 7,284,759 | B2* | 10/2007 | Heldmann | F16J 15/32 277/351 |
| 7,651,102 | B2 | 1/2010 | Heldmann et al. | |
| 7,959,157 | B2* | 6/2011 | Dobbs | F16J 15/3268 277/572 |
| 8,292,302 | B2 | 10/2012 | Heldmann et al. | |
| 8,474,828 | B2 | 7/2013 | Heldmann et al. | |
| 8,756,784 | B2* | 6/2014 | Harmon | F16J 15/3268 29/463 |
| 8,783,133 | B2* | 7/2014 | Pietras | F16J 15/3268 74/609 |
| 8,910,948 | B2 | 12/2014 | Heldmann et al. | |
| 10,933,520 | B2 | 3/2021 | Muller | |
| 11,933,361 | B2* | 3/2024 | Bertolini | F16C 33/7889 |
| 2008/0143055 | A1 | 6/2008 | Dobbs et al. | |
| 2011/0179620 | A1* | 7/2011 | Harmon | F16J 15/3268 49/463 |
| 2011/0185844 | A1* | 8/2011 | Pietras | F16J 15/3268 29/446 |
| 2013/0256995 | A1* | 10/2013 | Heldmann | F16J 15/32 277/551 |
| 2020/0393047 | A1* | 12/2020 | Arobbio | F16J 15/54 |
| 2020/0408296 | A1* | 12/2020 | Japinga | F16H 57/029 |
| 2024/0255058 | A1* | 8/2024 | Marchisio | F16J 15/3268 |

FOREIGN PATENT DOCUMENTS

| | | |
|---|---|---|
| EP | 1798448 A1 | 6/2007 |
| KR | 20050048073 A | 5/2005 |

OTHER PUBLICATIONS

Office Action and Search Report from the Chinese Patent Office dispatched May 28, 2024 in related application No. 202010541615.0, and translation thereof.

* cited by examiner

PROTECTION DEVICE FOR A SEALING RING, IN PARTICULAR AN OIL SEALING RING FOR VEHICLE TRANSMISSION COMPONENTS AND ASSOCIATED SEALING SYSTEM

CROSS-REFERENCE

This application claims priority to Italian patent application Ser. No. 102023000001245 filed on Jan. 27, 2023, the entire contents of which are fully incorporated herein by reference.

BACKGROUND OF THE INVENTION

The present invention relates to seals, and more particularly to a protection device for a sealing ring, such as an oil sealing ring for vehicle transmission components.

As is known, in vehicle transmission components, particularly a differential device, it is required to insert a rotating shaft through an opening of the device during assembly of the vehicle transmission. Typically, the opening of the transmission device has a sealing ring which, at the moment of assembly, engages with the shaft so as to prevent the leakage of oil and grease from the device and the entry of any external contaminants into the device.

However, before assembly of the shaft, contaminants may enter the transmission device and, especially during transport of the device to an assembly line, an undesirable leakage of oil or lubricating grease present in the device may occur, for example in the case of a transmission device that includes a vehicle gearbox.

In order to reduce the risk of entry of contaminants, it is known to close the inlet opening, which is already provided with the sealing ring, by means of a plug. However, both the plug and in particular the shaft (usually a splined shaft), when it is assembled after removal of the plug, may damage or deform the sealing lip or lips of the sealing ring, which may then result in the leakage of oil and grease. Such damage or deformation typically happens in the case of the seal located where the shaft exits the vehicle differential.

In order to avoid this latter drawback, it is known to use a PTFE ring mounted on the inner diameter of the sealing ring in addition to the aforementioned plug in order to guide the transmission shaft, but this ring only partly protects the main sealing lip of the seal from any damage. Moreover, the assembly of two (or more) separate components, in addition to being costly, results in excessively large dimensions and assembly difficulties and may often be impossible to use because of the design constraints.

In order to overcome all these drawbacks, an integrated plug/protection device has been developed which allows a single assembly operation to be performed and drastically reduces the dimensions, in particular the axial dimensions. However, this solution, while being effective in simplifying the assembly and transport operations and protecting the transmission device from the entry of external contaminants, is incapable of preventing the accidental leakage of lubricant during operations involving the movement and transportation of the device itself, despite the presence of the plug.

SUMMARY OF THE INVENTION

An object of the present invention is to provide an integrated protection device and an associated sealing system which are intended to protect a sealing ring, in particular an oil sealing ring for vehicle transmission components, which do not have the drawbacks of the prior art and which are at the same time reliable, inexpensive to produce and assemble and which effectively protect, on the one hand, the sealing ring from any damage and, on the other hand, the transmission device both form the entry of contaminants and, in particular, from the accidental leakage of lubricant.

Therefore, the present invention is an integrated protection device and an associated sealing system for the protection of a sealing ring, in particular an oil sealing ring for vehicle transmission components, having the characteristic features indicated in the attached claims.

BRIEF DESCRIPTION OF THE SEVERAL VIEWS OF THE DRAWINGS

The invention will now be described with reference to the attached drawings which illustrate a non-limiting example of embodiment thereof, in which.

DETAILED DESCRIPTION OF THE INVENTION

Figure 8:
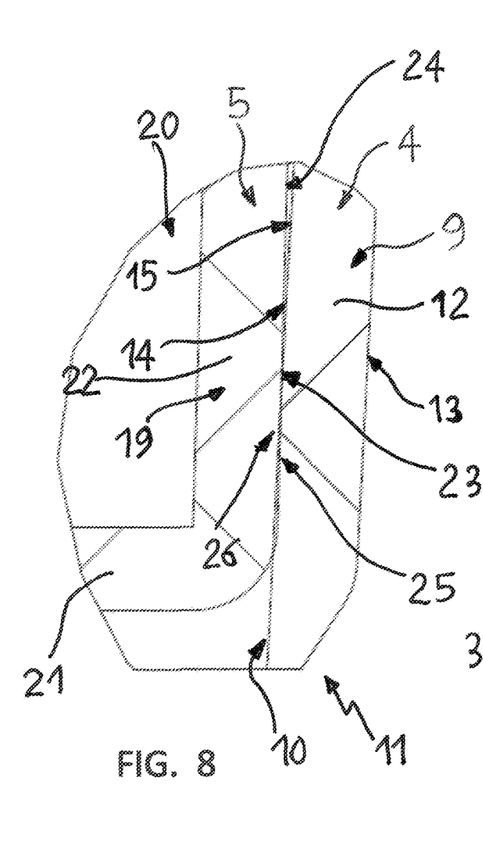
FIG. 8 shows in schematic form and on a greatly enlarged scale an elevation and radially sectioned view of a detail "B" of FIG. 7 (shown encircled and indicated by means of an arrow in FIG. 7) of the integrated protection device according to the invention, illustrating an essential part of the associated sealing system according to the invention.
Figure 9:
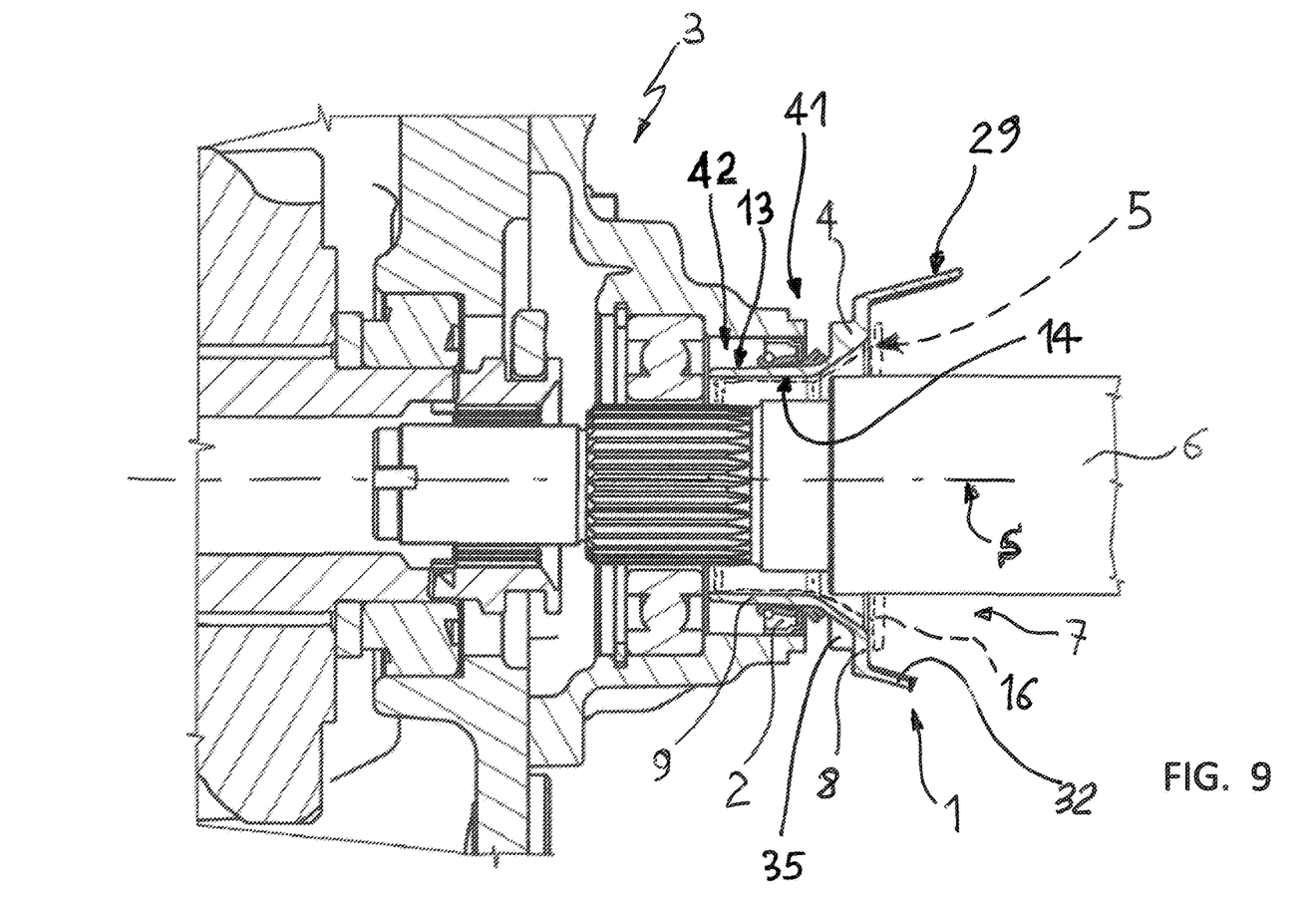
FIG. 9 illustrates in schematic form the associated sealing system according to the invention, applied to a (known) vehicle transmission component, shown only schematically and only partly for simpler illustration, as well as operation of the integrated protection device according to the invention.

With reference to FIGS. 1 to 9, an integrated protection device 1 for a sealing ring 2 (FIG. 9) which, in the non-limiting, but preferred embodiment shown in FIG. 9, is an oil sealing ring 2 for a vehicle transmission component 3, for example, a differential or gearbox.

The integrated device 1 comprises an annular element 4 (FIGS. 1 and 4) configured as a tubular cap designed to be inserted inside the sealing ring 2, coaxially therewith, so as to protect, during use, the sealing ring 2 during insertion of a rotating shaft 6 through the sealing ring 2 and inside the transmission component 3, and a plug 5 (FIGS. 1, 2 and 3) configured to be axially inserted inside the annular element 4 in the manner as described below.

Figure 1:
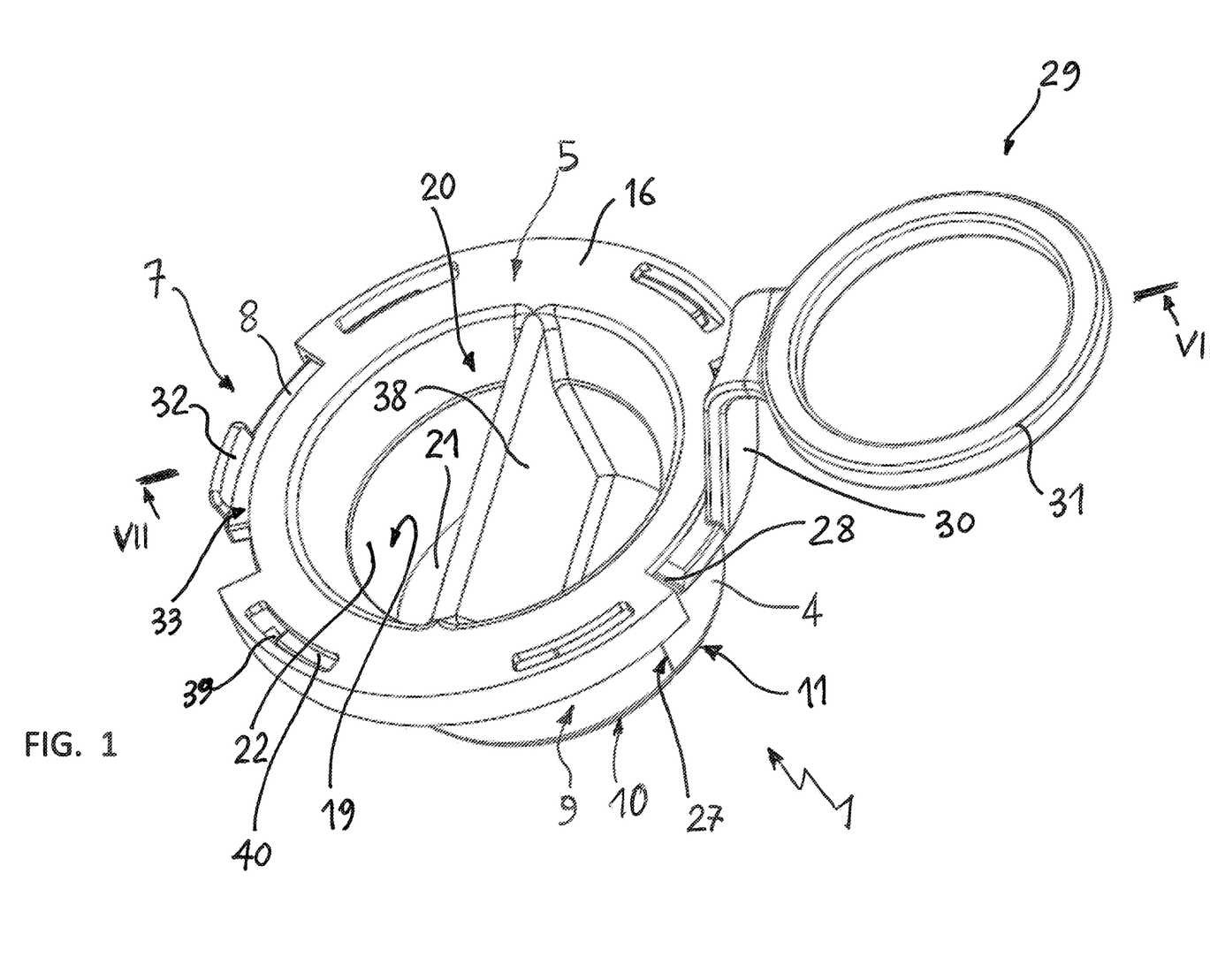
FIG. 1 shows in schematic form a three-quarters perspective view, from above, of the integrated protection device according to the invention.
Figures 2, 3:
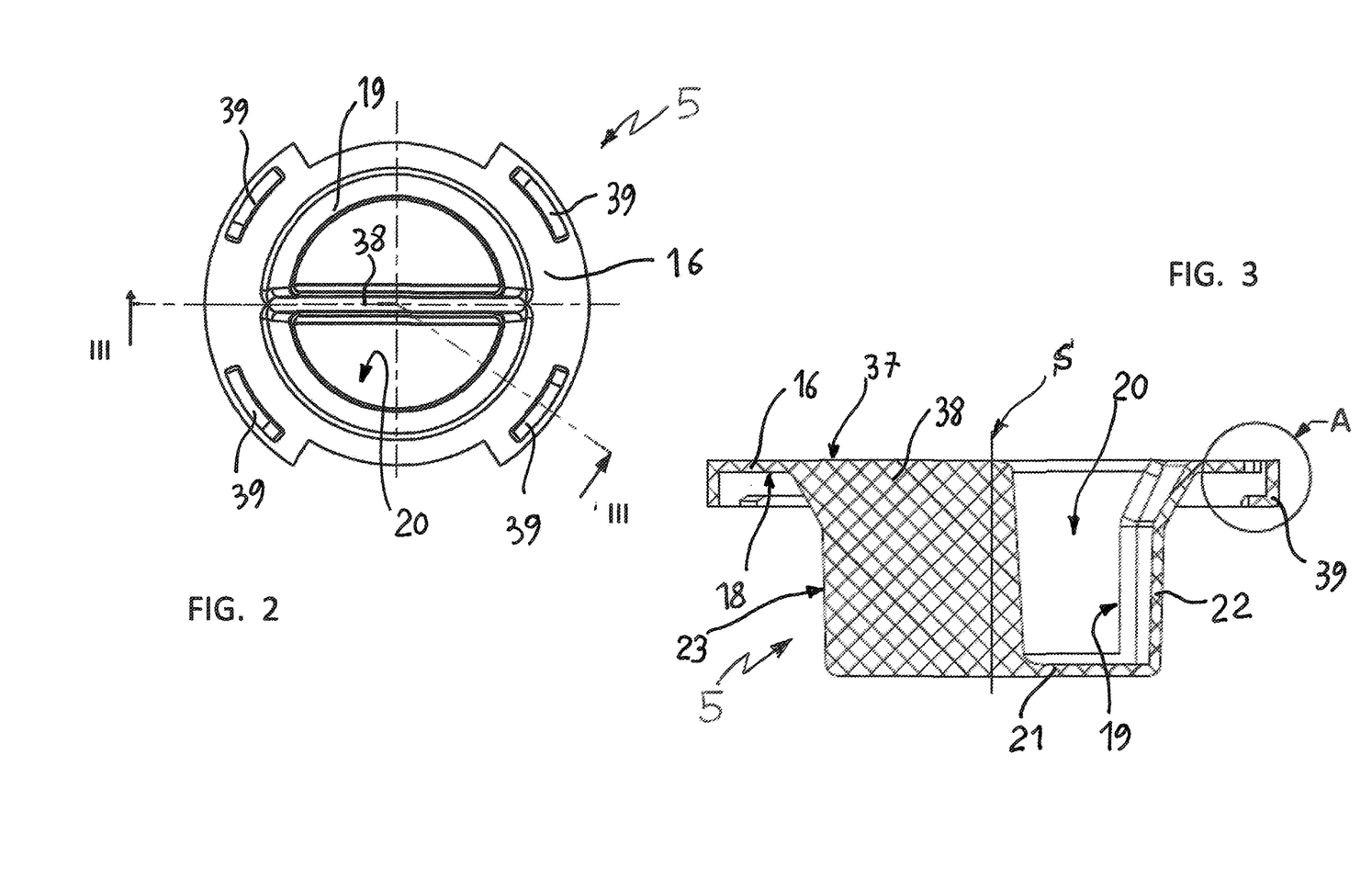
FIG. 2 illustrates schematically a top plan view of a first component of the integrated protection device according to FIG. 1, the first component consisting of a plug component.
FIG. 3 shows in schematic form an elevation view, sectioned along a plane indicated by the line III-III, of the plug component according to FIG. 2.
Figures 4, 5, 6:
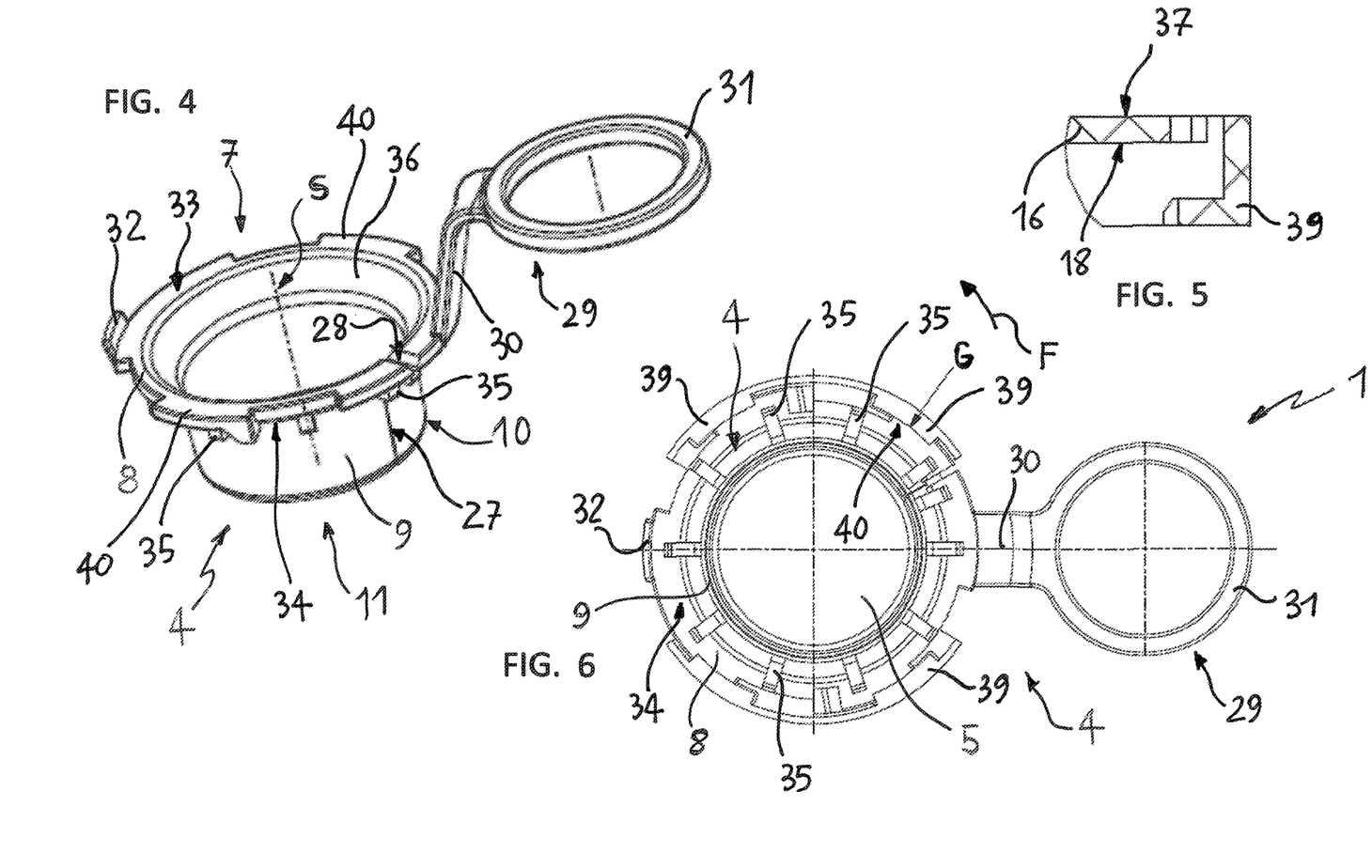
FIG. 4 shows in schematic form a three-quarters perspective side view of a second component of the integrated protection device of FIG. 1, according to the invention, the second component consisting of a ring or annular element which can be broken off.
FIG. 5 shows in schematic form and on an enlarged scale a detail "A" of FIG. 3, the detail being indicated by means of arrow and shown encircled in FIG. 3.
FIG. 6 shows in schematic form a bottom plan view of the integrated protection device according to FIG. 1.
Figure 7:
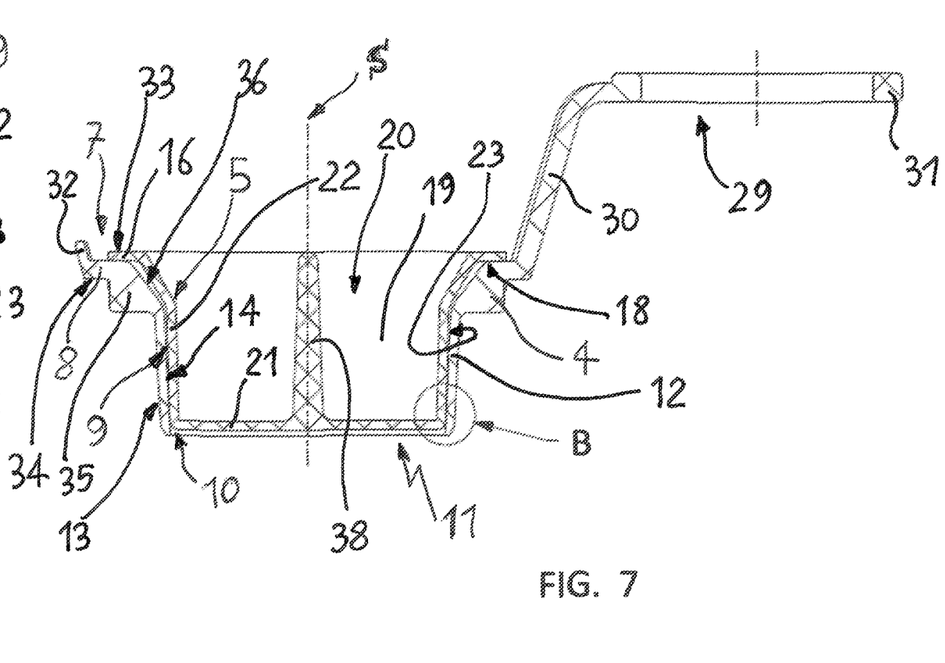
FIG. 7 shows in schematic form, on a slightly smaller scale, an elevation view, sectioned along a plane indicated by the line VII-VII, of the integrated protection device according to FIG. 1, illustrating an example of the coupled arrangement of the plug component and the ring component of FIG. 4.

The annular element 4 comprises a flange portion 8 delimiting a first end 7 thereof and a sleeve portion 9 having a first axis of symmetry S and extending axially projecting from the flange portion 8 so as to delimit with a free, circular and open end 10 thereof, opposite to the flange portion 8, a second end 11 of the annular element 4, opposite to the end 7.

The axis of symmetry S coincides, during use, with the axis of symmetry of the sealing ring 2 and the axis of rotation and symmetry of the rotating shaft 6, which are indicated for simpler illustration by the same reference letter S.

The sleeve portion 9 comprises a side wall 12 bounded between a radially outer lateral surface 13 configured to be coupled, during use, directly in contact with the sealing ring 2 (FIG. 9), and a radially inner lateral surface 14, configured to receive slidingly, during use, the rotating shaft in the absence of the plug 5 (FIG. 9), and to also receive the plug 5 when present (FIG. 7), in the manner which will be described below.

According to a first aspect of the present invention, the radially inner lateral surface 14 of the side wall 12 of the sleeve portion 9 is defined at least partly by a first conical surface 15, coaxial with the axis S and having a taper directed towards the second end 11, forming with the axis of symmetry S a first acute angle, which is not indicated by a reference symbol in the figures for the sake of simpler illustration, but which can be seen in FIG. 8.

Here and below, the term "taper" is understood as meaning the direction towards which a conical surface, in the case in question the surface 15, converges towards the vertex of the ideal cone of which it forms part and, in the case in question, the direction towards which the generatrix of the conical surface of revolution 15 intersects the axis S.

According to a further aspect of the invention and in combination with that indicated above, the plug 5 comprises (FIGS. 2 and 3) a flange portion 16 configured to be removably coupled, on the side of a first annular face 18 thereof, with the flange portion 8 of the annular element 4 (FIG. 7), and a cup portion 19 delimiting inside of it a "concavity" or cavity 20.

The cup portion 19, which is symmetrical and coaxial with the axis S, extends axially projecting from the first face 18 of the flange portion 16 of the plug 5 and is configured to fit by means of axial engagement inside the sleeve portion 9 of the annular element 4 (FIG. 7), on the side of a bottom wall 21 of the cup portion 19, the bottom wall 21 delimiting the bottom of the concavity or cavity 20.

The cup portion 19 also comprises a side wall 22 formed transversely with respect to the bottom wall 21 and laterally delimiting the concavity/cavity 20.

According to one aspect of the invention, the side wall 22 of the cup portion 19 is bounded by a radially outer lateral surface 23 consisting at least partly of a second conical surface 24 (FIG. 8) coaxial with the first conical surface 15 and having a taper directed towards the bottom wall 21. According to an important aspect of the invention, the conical surface 24 forms a second angle with the axis of symmetry S, the second angle not being indicated for the sake of simplified illustration, but is clearly visible in FIG. 8. The second angle, which is again acute, must have a value that is lesser than a value of the first angle according to an aspect of the present invention.

Clearly, the surfaces 14 and 23 may be entirely delimited by the conical surfaces 15 and 24, or the conical surfaces 15 and 24 may constitute only axial sections of the respective lateral surfaces 14 and 23. Preferably, the conical surfaces 15 and 24 define respective end sections 25, 26 of the lateral surfaces 14 and 23, arranged respectively towards the end 11 and the bottom wall 21.

In any case, whether or not the end sections 25, 26 are defined by the conical surfaces 15 and 24, the side walls 12 and 22 are formed, according to the invention, so that the first end section 25 of the side wall 12 of the sleeve portion 9 of the annular element 4 and the second end section 26 of the side wall 22 of the cup portion 19 of the plug 5, as best shown in FIG. 8, are configured to be coupled together with an interference fit, on the side of the second end 11 of the annular element 4 and on the side of the bottom wall 21 of the cup portion 19 of the plug 5 respectively, so as to create between the side wall 12 of the sleeve portion 9 and the side wall 22 of the cup portion 19 a fluid-tight joint, shown schematically in FIG. 8, preferably realized by the coupling together with interference of the sections 25, 26 when they are delimited by the conical surfaces 15 and 24.

The plug 5 and the annular element 4 are made as two elements which are independent of each other and which can be separately produced or formed, but which can be removably coupled together, each made as one piece from a synthetic plastic material, for example by means of compression or injection molding.

According to an advantageous aspect of the present invention, the plug 5 and the annular element 4 may be made in colors which are different from each other and each plug/annular element pair 5, 4 intended for a certain transmission component model 3 may be produced with colors which are different from those of a plug/annular element pair 5, 4 intended for another, different transmission component model 3 in order to avoid assembly errors.

The annular element 4 is also formed so as to be breakable along its circumference, such that it may be removed from the transmission component 3 after insertion of the shaft 6. For this purpose, both the sleeve portion 9 and the flange portion 8 of the annular element 4 are provided with corresponding radial weakenings 27, 28 (FIGS. 1 and 4) formed axially and in line with each other or axially aligned, and extending over substantially the entire axial extension or extent of the annular element 4.

These radial weakenings 27, 28 may be obtained or formed by welding, for example ultrasound welding, with a smaller thickness opposite longitudinal adjacent edges of the side wall 12 and radial adjacent edges of the flange portion 8, in the case where the annular element or cap 4 is obtained by means of a one-piece molding in an open configuration and subsequently "enclosed" by the welding or joining process. Alternatively, the radial weakenings 27, 28 may consist of thinner portions of the flange portion 8 and the side wall 12 of the sleeve portion 9, obtained by suitably designing the mold when the annular element 4 is formed by molding, directly in the closed-ring use configuration.

Furthermore, the first end 7 of the annular element 4 defined by the flange portion 8 is provided radially on the outside and radially projecting with at least one handle 29, preferably consisting of a radial tab 30 terminating in a gripping ring 31, configured to be manually apply a stress onto the weakenings 27, 28 which causes the breakage thereof, for example immediately after introducing the shaft 6 into the transmission component 3.

The flange portion 8 of the annular portion 4 is provided with a fin 32 on a radially outer perimetral edge thereof, the fin 32 axially projecting from a first annular face 33 of the flange portion 8 of the annular element 4. The face 33 is arranged on the opposite side to the sleeve portion 9 and the fin 32 is formed integrally as one piece with the flange portion 8, preferably in a position diametrically opposite to the handle 29.

The flange portion 8 of the annular element 4 is also configured to mate or engage axially in abutment, during use, with the sealing ring 2 to be protected (FIG. 9). For this purpose, the flange portion 8 is bounded, towards the sleeve portion 9, by a second annular face 34 provided with a plurality of radial bosses 35 arranged annularly or circumferentially with respect to each other and configured to engage during use, in axial abutment, against the sealing element 2 (FIG. 9) so as to allow correct axial positioning of the integrated protection device 1 with respect to the sealing element 2 to be protected.

The first end 7 of the annular element 4 is also provided with a connecting portion 36 (FIGS. 4 and 7) between the flange portion 8 and the sleeve portion 9, the connecting portion 36 being defined by an annular chamfer with a frustoconical shape formed integrally in the side wall 12 of the sleeve portion 9 and flared towards the flange portion 8.

The annular chamfer 36 defining the connecting portion of the annular element 4 is configured to guide, during use, the rotating shaft 6 coaxially inside the sealing ring 2 with the interposition of the sleeve portion 9.

According to a preferred embodiment of the present invention, the radial bosses 35 extend axially from the flange portion 8, as well as radially projecting on the outside of, and axially along, the entire annular chamfer 36 forming the connecting portion, as far as the side wall 12 of the sleeve portion 9.

According to an important aspect of the present invention, the first end section 25 of the side wall 12 of the sleeve portion 9 of the annular element 4 and the second end section 26 of the side wall 22 of the cup portion 19 of the plug 5 must have an axial extension or length, measured along the axis S, not greater than about ⅓ (one third) of the axial extension or length of the cup portion 19. As such, the extension of the interfering contact sections 25, 26 not only ensures the hydraulic seal between plug 5 and annular element 4 with the integrated protection device 1 when completely assembled, but also allows a relative rotation of plug 5 and annular element or cap 4 to be performed manually in order to assemble/disassemble the protection device 1 without excessive force.

For this purpose, the concavity 20 of the cup portion 19 of the plug 5 is situated or located on the side of a second face 37 of the flange portion 16 of the plug 5, opposite to the first face 18, and the cup portion 19 is formed integrally as one piece with the bottom wall 21 and with the flange portion 16.

Moreover, according to a preferred embodiment of the present invention, the plug 5 is made so as to be more rigid than the annular element 4. In particular, the annular element 4 may in fact be made so as to be at least partially flexible, in particular in the sleeve portion 9, so as to favor the breakage thereof by means of pulling, but maintains its form without the risk of undesirable deformations during the assembly operations also owing to the bosses 35, which are instead substantially rigid, being made with a suitable thickness.

Inside the cup portion 19, the plug 5 is provided transversely and preferably in a diametral direction, with a gripping flap 38 configured to allow an operator to rotate manually the plug 5 relative to the annular element 4, in both possible directions of rotation (i.e., clockwise and counterclockwise).

In fact, in order to ensure both that the interference fit and fluid-tight coupling between the sections 25 and 26 is maintained with a suitable contact pressure once the plug 5 is coupled inside the annular element 4 and to ensure that the plug 5 cannot accidentally come out of the annular element 4, the flange portion 16 of the plug 5 is provided, axially projecting on the side of its first face 18 (FIGS. 3 and 5), with first bayonet coupling elements 39, preferably consisting of first lugs 39 which are formed in radial cross-section as C-shaped or L-shaped and are circumferentially spaced from each other along the outer radially perimetral edge of the flange portion 16.

These lugs 39 are configured to engage, following relative rotation in a first predefined direction of plug 5 and annular element 4, underneath respective second bayonet coupling elements 40 of the annular element 4, and to alternatively disengage from underneath the second bayonet coupling elements 40, following a relative rotation in a second predefined direction, opposite to the first direction, of plug 5 and annular element 4.

The bayonet coupling elements 40 are preferably formed by second lugs 40 formed radially projecting from the flange portion 8, being arranged circumferentially spaced from each other by a greater amount than the circumferential spacing of the first lugs 39.

FIG. 6 schematically shows the engaged position, indicated by the arrow G; by rotating the plug 5 in the direction of the arrow F, the bayonet coupling elements 39 and 40 are brought into the disengaged position (i.e., disengaged from each other), and it is therefore possible to remove the plug 5 from inside the annular element 4 with a minimum amount of force.

This is possible owing to the fact that, assuming the aforementioned critical parameter of the maximum permissible length for the sections 25, 26 which provide a fluid-tight coupling between the cup portion 19 and the sleeve portion 9 is respected, these two elements, and consequently the plug 5 and the annular element or cap 4, do not remain "glued" to each other or engaged, even if they are formed partly or entirely by the two conical surface sections 15, 24, which may be preferably made so as to obtain or form between them a Morse taper coupling.

Finally, from the description above, it is clear that the present invention also relates to a sealing system, denoted overall by 41 (FIG. 9), for a vehicle transmission component 3, which can be applied to an inlet opening 42 (FIG. 9) for a rotating shaft 6 of the transmission component 3. The sealing system 41 comprises an oil sealing ring 2 housed in the inlet opening 41 and configured to receive, passing through it, during use, the rotating shaft 6 and an integrated protection device 1 as described above, wherein the annular element 4 with the plug 5 inserted inside it, locked by means of a bayonet coupling, is inserted inside the sealing ring 2 so that the plug 5 is also inserted inside the sealing ring 2 and, together with the annular element 4, closes in a substantially fluid-tight manner the mouth 42 and wherein the annular element 4 is coupled, slidingly and with slight interference, together with the sealing lip(s) of the sealing ring 2, causing it to assume an elastically deformed configuration.

This allows the opening 42 to be effectively closed in a rapid and simple manner, in fact using the plug 5 and the annular element 4 as a single device.

When the transmission component 3 is on an assembly line and ready to receive the shaft 6, it is merely required to remove the plug 5 by rotating the plug 5 by means of the flap 38 so as to free the opening 42 almost completely, the side wall 12 of the sleeve portion 9 being relatively thin.

At this point the shaft 6 can be introduced by inserting it inside the annular element 4; during this movement, the shaft 6 does not come into contact with the sealing ring 2, which is therefore effectively protected from any risk of damage.

Finally, with the shaft 6 in position, an operator merely needs to grip the handle 29 and/or the fin 32 in order to remove at least partly the annular element 4 from the opening 42, causing it to slide on the shaft 6. Also, during this movement, the side surface 13 protects the sealing ring 2; in order to allow an easier sliding movement, the side surface 13 is also made as a conical surface having a taper corresponding to that of the surfaces 15,23.

Thereafter, the operator, using the handle 29, exerts on the annular element 4 a twisting action which breaks/tears the weakenings 27, opening the annular element 4, which may thus be removed.

In addition to the features and benefits described above, the solution according to the present invention also seals, in a fluid-tight manner, the opening 42 between the plug 5 and the annular element 4, contrary to the known similar solutions in which lubricant may seep between these two elements even when a device is correctly inserted inside the opening 42.

All the objects of the present invention are therefore achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An integrated protection device for a sealing ring, the integrated device comprising:
   an annular element formed as a tubular cap configured to fit coaxially within the sealing ring so as to protect the sealing ring during insertion of a rotating shaft into the sealing ring; and
   a plug configured to fit axially inside the annular element;
   wherein the annular element includes a flange portion delimiting a first end of the annular element and a sleeve portion axially projecting from the flange portion and having a first axis of symmetry, a radially outer lateral surface configured to mate directly in contact with the sealing ring, and a radially inner lateral surface configured to slidingly receive the rotating shaft, the radially inner lateral surface being defined at least partly by a first conical surface having a taper directed on the opposite side to the first end and forming a first angle with the axis of symmetry;
   wherein the plug includes a flange portion configured to removably mate with the flange portion of the annular element and a cup portion axially projecting from the flange portion of the plug and configured to fit within the sleeve portion of the annular element on a side opposite to the flange portion of the plug, the cup portion including a side wall bounded by a radially outer lateral surface including a second conical surface coaxial with the first conical surface and having a taper directed on the same side and forming a second angle with the axis of symmetry, the second angle having a value lesser than a value of the first angle;
   wherein a first end section of the sleeve portion of the annular element and a second end section of the cup portion of the plug are configured to engage with an interference fit on the opposite side to the flange portions so as to create a fluid-tight coupling between the plug and the annular element; and
   wherein a side wall of the sleeve portion of the annular element includes the first end section and a side wall of the cup portion of the plug includes the second end section, the first end section and the second end section each have an axial extension or length of no greater than about ⅓ (one third) of the axial extension or length of the cup portion.

2. The integrated protection device according to claim 1, wherein the plug and the annular element are each separately formed as one piece from a synthetic plastic material and are detachably coupled together.

3. The integrated protection device according to claim 1, wherein:
   the sleeve portion of the annular element includes a side wall bounded between the radially outer lateral surface and the radially inner lateral surface of the sleeve portion, the side wall having a free, circular and open end opposite to the flange portion of the annular element and defining a second end of the annular element, the sleeve portion axially projecting from a first annular face of the flange portion of the annular element;
   the cup-shaped portion of the plug has a bottom wall extending transversely with respect to the side wall of the cup-shaped portion and an inner cavity bounded by the side wall of the cup-shaped portion and by the bottom wall of the cup-shaped portion; and
   the annular element is configured to be circumferentially breakable and each one of the sleeve portion and the flange portion of the annular element is provided with a radial weakening, the two weakenings being axially aligned and extending over substantially the entire axial extent of the annular element, and at least one handle radially projects from a radial outer side of the first end of the annular element defined by the flange portion, the handle being configured to manually apply a stress on the two weakenings so as to cause breakage of the weakenings.

4. The integrated protection device according to claim 3, wherein the at least one handle preferably includes a radial tab terminating in a gripping ring.

5. The integrated protection device according to claim 3, wherein the flange portion of the annular element has a radially outer perimetral edge, a first annular face disposed on a side opposite to the sleeve portion and a fin provided on the outer perimetral edge and projecting axially from the first annular face, the fin being integrally formed with the flange portion of the annular element in a position diametrically opposite to the handle.

6. The integrated protection device according to claim 3, wherein:
the cavity of the cup portion of the plug is located on a side of a second face of the flange portion of the plug, opposite to the first face of the flange portion of the plug, the cup portion being integrally formed as one piece with the bottom wall and with the flange portion of the plug;
the plug being formed to be more rigid than the annular element, and, within the cup portion, the plug is provided transversely and in a diametrical position with a gripping flap for rotating the plug relative to the annular element; and
the flange portion of the plug is provided with first bayonet coupling elements axially projecting on the side of the first face of the flange portion, the first bayonet coupling elements including first lugs having L-shaped or C-shaped radial cross-sections and being circumferentially spaced from each other and configured to engage underneath and alternatively disengage from underneath of respective second bayonet coupling elements of the annular element as a result of a relative rotation of the plug and the annular element, the second bayonet coupling elements including second lugs radially projecting from the flange portion of the annular element and being circumferentially spaced from each other by an amount greater than the circumferential spacing of the first lugs.

7. The integrated protection device according to claim 1, wherein the flange portion of the annular element is configured to mate axially in abutment with the sealing ring and is bounded by a second annular face facing toward the sleeve portion, the second annular face being provided with a plurality of radial bosses spaced circumferentially apart and configured to engage in axial abutment against the sealing ring so as to allow a desired axial positioning of the integrated protection device with respect to the sealing ring.

8. The integrated protection device according to claim 7, wherein the first end of the annular element has a connecting portion located between the flange portion of the annular element and the sleeve portion of the annular element, the connecting portion having an annular chamfer with a frustoconical shape formed integrally in a side wall of the sleeve portion and flared towards the flange portion of the annular element, the annular chamfer being configured to guide the rotating shaft coaxially within the sealing ring with the interposition of the sleeve portion between the shaft and the sealing ring.

9. The integrated protection device according to claim 8, wherein the radial bosses extend axially from the flange portion of the annular element and project radially outwardly from and axially along the entire annular chamfer forming the connecting portion to the side wall of the sleeve portion.

10. A sealing system for a transmission component of vehicles, configured to be applied to an inlet opening for a rotating shaft of the transmission component, the sealing system comprising:
an oil sealing ring housed on and/or in the inlet opening and configured to receive the rotating shaft; and
an integrated protection device according to claim 1.

11. An integrated protection device for a sealing ring, the integrated device comprising:
an annular element formed as a tubular cap configured to fit coaxially within the sealing ring so as to protect the sealing ring during insertion of a rotating shaft into the sealing ring; and
a plug configured to fit axially inside the annular element;
wherein the annular element includes a flange portion delimiting a first end of the annular element and a sleeve portion axially projecting from the flange portion and having a first axis of symmetry, a radially outer lateral surface configured to mate directly in contact with the sealing ring, and a radially inner lateral surface configured to slidingly receive the rotating shaft, the radially inner lateral surface being defined at least partly by a first conical surface having a taper directed on the opposite side to the first end and forming a first angle with the axis of symmetry;
wherein the plug includes a flange portion configured to removably mate with the flange portion of the annular element and a cup portion axially projecting from the flange portion of the plug and configured to fit within the sleeve portion of the annular element on a side opposite to the flange portion of the plug, the cup portion including a side wall bounded by a radially outer lateral surface including a second conical surface coaxial with the first conical surface and having a taper directed on the same side and forming a second angle with the axis of symmetry, the second angle having a value lesser than a value of the first angle;
wherein a first end section of the sleeve portion of the annular element and a second end section of the cup portion of the plug are configured to engage with an interference fit on the opposite side to the flange portions so as to create a fluid-tight coupling between the plug and the annular element;
wherein the sleeve portion of the annular element includes a side wall bounded between the radially outer lateral surface and the radially inner lateral surface of the sleeve portion, the side wall having a free, circular and open end opposite to the flange portion of the annular element and defining a second end of the annular element, the sleeve portion axially projecting from a first annular face of the flange portion of the annular element;
wherein the cup-shaped portion of the plug has a bottom wall extending transversely with respect to the side wall of the cup-shaped portion and an inner cavity bounded by the side wall of the cup-shaped portion and by the bottom wall of the cup-shaped portion;
wherein the annular element is configured to be circumferentially breakable and each one of the sleeve portion and the flange portion of the annular element is provided with a radial weakening, the two weakenings being axially aligned and extending over substantially the entire axial extent of the annular element, and at least one handle radially projects from a radial outer side of the first end of the annular element defined by the flange portion, the handle being configured to manually apply a stress on the two weakenings so as to cause breakage of the weakenings;

wherein the cavity of the cup portion of the plug is located on a side of a second face of the flange portion of the plug, opposite to the first face of the flange portion of the plug, the cup portion being integrally formed as one piece with the bottom wall and with the flange portion of the plug;

wherein the plug is formed to be more rigid than the annular element, and, within the cup portion, the plug is provided transversely and in a diametrical position with a gripping flap for rotating the plug relative to the annular element; and wherein the flange portion of the plug is provided with first bayonet coupling elements axially projecting on the side of the first face of the flange portion, the first bayonet coupling elements including first lugs having L-shaped or C-shaped radial cross-sections and being circumferentially spaced from each other and configured to engage underneath and alternatively disengage from underneath of respective second bayonet coupling elements of the annular element as a result of a relative rotation of the plug and the annular element, the second bayonet coupling elements including second lugs radially projecting from the flange portion of the annular element and being circumferentially spaced from each other by an amount greater than the circumferential spacing of the first lugs.

* * * * *